United States Patent [19]

Peterson

[11] Patent Number: 5,017,151
[45] Date of Patent: May 21, 1991

[54] FLOATING PANEL MOUNT FOR ELECTRICAL CONNECTORS

[75] Inventor: Bruce A. Peterson, Schaumburg, Ill.

[73] Assignee: Molex Incorporated, Lisle, Ill.

[21] Appl. No.: 594,804

[22] Filed: Oct. 5, 1990

[51] Int. Cl.$^5$ ............................................. H01R 13/64
[52] U.S. Cl. ...................................... 439/248; 439/557
[58] Field of Search ............... 439/246, 247, 248, 374, 439/378, 552, 554, 555, 557, 567, 545, 547, 549, 78

[56] References Cited

U.S. PATENT DOCUMENTS

| | | | |
|---|---|---|---|
| 2,976,345 | 3/1961 | Whitted | 439/552 |
| 4,477,142 | 10/1984 | Cooper | 439/567 |
| 4,650,267 | 3/1987 | Yagi | 439/78 |
| 4,664,458 | 5/1987 | Worth | 439/248 |
| 4,691,971 | 9/1987 | Hahn | 439/78 |
| 4,820,180 | 4/1989 | Mosquera et al. | 439/248 |

*Primary Examiner*—David L. Pirlot
*Attorney, Agent, or Firm*—Louis A. Hecht; Stephen Z. Weiss; Charles S. Cohen

[57] ABSTRACT

A floating panel mount for an electrical connector is provided. The floating panel mount includes a central support post from which a pair of helically configured inwardly collapsible vanes extend. The vanes are tapered to define a minor cross-sectional dimension less than the diameter of a mounting aperture in the panel and a major dimension which exceeds the diameter of the mounting aperture. The support post is generally circular in cross-section throughout substantially the entire length thereof and includes a bore in a distal end thereof to decrease insertion forces of the post into the mounting aperture in the panel. The vanes are spirally collapsed in response to ramping forces generated as the floating panel mount is urged into the mounting aperture of the panel. The vanes then resiliently return to their undeflected condition to engage the panel. In this mounted condition, the vanes permit radial float of the electrical connector relative to the panel, but prevent backup in response to mating forces.

11 Claims, 2 Drawing Sheets

FLOATING PANEL MOUNT FOR ELECTRICAL CONNECTORS

FIELD OF THE INVENTION

This invention generally relates to the art of electrical connectors and, particularly, to a floating panel mount for mounting an electrical connector to a panel.

BACKGROUND OF THE INVENTION

Panel mounted electrical connectors comprise a nonconductive or dielectric housing having at least one electrically conductive terminal mounted therein. The housing also includes or is adapted to receive means for mounting the housing to a panel. The panel mounted connector is mateable with other circuitry, such as another connector, which, in turn, may be mounted to a second panel, a cable or discrete wires.

The mating of a panel mounted electrical connector to another circuit component often is carried out under blind mating conditions such that precise alignment of the panel mounted connector with the other circuit components cannot be assured. Blind mating of panel mounted connectors may occur with components of photostatic copiers, computer equipment and telecommunications equipment. An attempt to forcibly blind mater improperly aligned electrical connectors can damage the housing of the connector, the fragile terminals in the housing or the panels to which the connectors are mounted. Improper alignment also may prevent complete mating, thereby negatively affecting the quality of the electrical connection.

Many prior art panel mounted electrical connectors are provided with means for permitting a controlled amount of float between the connector housing and the associated panel. Most such connectors have been fairly complex multi-component structures that are manufactured separately from the electrical connector and require complex assembly and installation. An example of such a floating panel mount is shown in U.S. Pat. No. 4,647,130.

Other prior art floating panel mount connectors include a plurality of components that can be assembled to one another from opposite sides of the panel. These prior art connectors typically includes spacers which prevent tight engagement of the connector components to the panel. Thus, the assembled components permit a controlled amount of float relative to the panel about which they are assembled. An example of such a connector is shown in U.S. Pat. No. 3,645,353 which issued to Cope et al. on Feb. 29, 1972. Connectors of this type are undesirable in that the plural components required for the connector require complex assembly and substantially increase the cost of the connector. In this regard, it is important to emphasize that the electrical connector industry is extremely competitive, and even small savings in cost can be an extremely significant advantage.

Other floating panel mount connectors merely include a pair of angularly aligned deflectable latch arms that are mounted respectively to opposite sides of the housing, and that deflect upon insertion of the connector into the panel. The latch arms are dimensioned to pass through an aperture in the panel as the connector approaches its fully seated condition. The deflectable latch arms then are resiliently returned to their original alignment such that the ends of the latch arms will engage one side of the panel. Thus, the deflectable latch arms are intended to prevent separation of the connector from the panel while still permitting a limited amount of float between the connector and the panel. Examples of this prior art are shown in U.S. Pat. No. 3,213,189 which issued to Mitchell et al on Oct. 19, 1965; U.S. Pat. No. 3,514,743 which issued to Schampz on May 26, 1970; and U.S. Pat. No. 3,543,219 which issued to Pautrie on Nov. 24, 1970. Similar prior art structures are shown in German Patent No. 258,382 dated Nov. 27, 1967 and German Patent No. 2,547,951 dated May 5, 1977. Still another similar structure is shown in IBM Technical Disclosure Bulletin entitled "Interchangeable Means for Holding A Circuit Card to A Framework" dated Feb. 1987.

The above described prior art floating panel mount connectors generally have been effective in retaining a connector to a panel. However, these prior art floating panel mount connectors often require significant forces to mount the connector to the panel. High mounting forces create the potential for damage to either the connector or to the panel. Attempts to reduce mounting forces by providing smaller more flexible deflectable latches create the potential for significant backup of the connector during mating. More particularly, the mating of the panel mounted connector to another circuit component generates mating forces as the electrically conductive connector terminals of the panel mounted connector engage the contact surfaces of the circuit component to which the panel mounted connector is mated. These high connector mating forces can cause the latches of the floating panel mount connector to deflect significantly and urge the panel mounted connector away from the circuit component connector with which it is mating. In some circumstances, this backup can prevent the panel mounted connector from mating fully with the other circuit component connectors.

An extremely effective prior art floating panel mount connector is shown in U.S. Pat. No. 4,820,180 which issued to Rene Mosquera and Wayne Zahlit on Apr. 11, 1989 and which is assigned to the assignee of the subject application. The floating panel mount disclosed in U.S. Pat. No. 4,820,180 includes at least one pair of opposed multiple cantilevered latch structures with each multiple cantilevered latch structure comprising a plurality of independently deflectable cantilevered arms. The independent multiple deflection of the cantilevered arms enables mounting of the connector to the panel with low mounting forces. The cross-sectional dimensions of the arms also enable significant float of the connector relative to the panel. However, the angular alignment of the deflectable arms relative to one another achieves secure mounting of the connector to the panel. The angular alignment of the arms in each latch structure or in each pair of latch structures facilitates the deflection of the arms for selective removal of the connector from the panel. Other preferred features of the floating panel mount connector of U.S. Pat. No. 4,820,180 are disclosed in that specification, the disclosure of which is incorporated herein by reference.

Although the floating panel mount electrical connector of U.S. Pat. No. 4,820,120 is extremely effective, an improvement is disclosed in application Ser. No. 467,629 to Toedtman, filed Jan. 19, 1990 and assigned to the assignee of this invention, and which is incorporated herein by reference. Toedtman shows a floating panel that exhibits even less backup during mating, while still exhibiting the other desirable features of the floating panel mount disclosed in U.S. Pat. No. 4,820,180, including low mounting forces and significant float. The present invention is directed to still further improvements in such floating panel mounts to increase the strength of the mount and further decrease the insertion forces involved.

SUMMARY OF THE INVENTION

An object, therefore, of the invention is to provide an improved floating panel mount for mounting an electrical connector to a panel, the panel having at least one mounting aperture therein.

In the exemplary embodiment of the invention, the floating palen mount may be unitarily molded with the housing of a panel mounted electrical connector, or may be selectively employed with a panel mountable electrical connector having means for receiving and engaging the subject floating panel mount structure. The floating panel mount and the associated electrical connector are employable with a panel having a mounting aperture extending therethrough.

The floating panel mount of the subject invention comprises a base disposed to extend substantially parallel to the panel to which the connector is mounted. The base may be unitarily molded with the mounting flange on the panel mountable electrical connector. The floating panel mount further comprises a post extending from the base and/or from the mounting flange of the connector. The post typically will extend substantially orthogonally from the base. The cross-sectional dimensions of the post are less than the cross-sectional dimensions of the mounting aperture extending through the panel to which the electrical connector is mounted. The relative differences between the cross-sectional dimensions of the post and the cross-sectional dimensions of the mounting aperture are selected in accordance with the amount of float that is preferred to exist therebetween. The length of the post is substantially greater than the thickness of the panel to which the connector is mounted.

The floating panel mount of the subject invention further comprises at least one deflectable spiral vane which extends from the post. The vane is configured to deflect spirally inwardly and toward the post upon insertion of the floating panel mount into the mounting aperture of the panel. More particularly, the vane may be of tapered or generally triangular configuration to define a minor width at portions thereon remote from the base and to define progressively greater widths at locations thereon closer to the base. Portions of the vane spaced from the mounting post may be arcuate to facilitate the inward collapsing of the vane relative to the post. In particular, the vane may define a spirally configured outer edge and/or helically formed surfaces extending from the post to the outer edge. The shape of the vane is selected in accordance with the material from which the vane is formed and the relative dimensions of the vane. The shape and dimensions of the vane are selected to ensure inward collapsing of the vane relative to the post in response to relatively low forces generated as the post and the vane are urged through the mounting aperture in the panel.

Preferably, the floating panel mount comprises a plurality of vanes extending from the post. The vanes preferably are disposed generally symmetrically relative to the post to substantially minimize deflection of the post in response to mating forces. Additionally, the vanes preferably are configured to deflect in generally opposite directions relative to the post in response to the forces exerted thereon during mounting onto the panel. In particular, the vanes may be configured to deflect generally helically inwardly towards the post in response to the forces generated between the vanes and the panel during mounting of the electrical connector to the panel. The vanes are configured to progressively deflect inwardly as the connector is mounted to the panel. However, upon sufficient insertion into the panel, the trailing surface of each vane will clear the panel, thereby enabling the vanes to resiliently return to their original configuration. This resilient return of each vane to its original configuration will cause the trailing surface of the vane to engage a surface of the panel.

The floating panel mount is constructed to facilitate the selective separation of the connector from the panel. More particularly, relatively minor pressure exerted by a thumb and forefinger on the vane will enable sufficient inward collapsing of the vane toward the post to enable the collapsed vanes to pass back through the mounting aperture in the panel.

The improvements of the present invention contemplate that the support post from which the spiral vanes project be circular in cross-section throughout substantially the entire lengths of the posts. This improves the strength of the panel mount attachment and considerably decreases the complexity of the required mold for unitarily molding the floating panel mount construction. In addition, an axial bore extends at least partially through the post so that it is hollow through at least a portion of its length, particularly at the distal end thereof, to decrease the insertion force of the mount.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the following description taken in conjunction with the accompanying drawings, in which like reference numerals identify like elements in the figure and in which:

DETAILED DESCRIPTION OF THE PREFERRED EMBODIMENT

Figure 1:
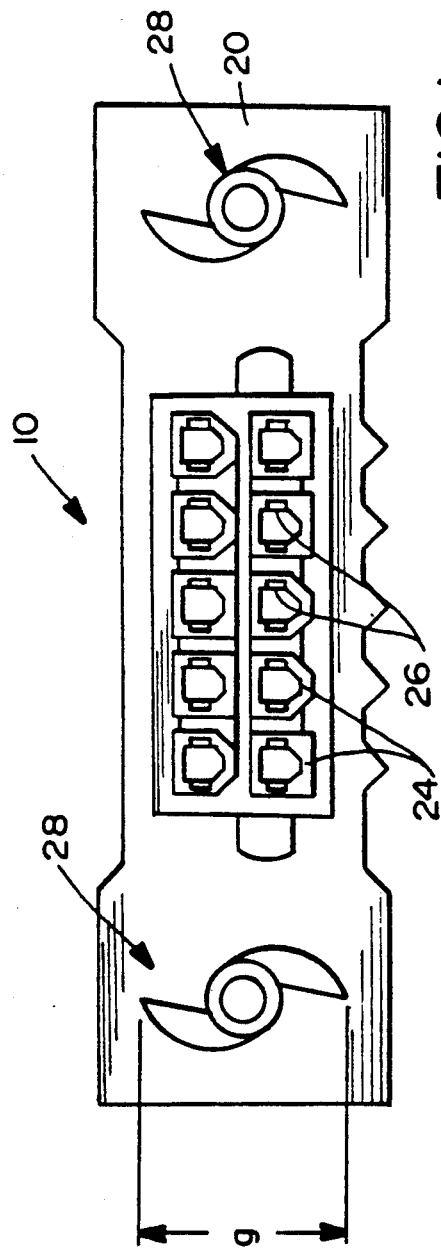
FIG. 1 is a top plan view of an electrical connector employing the floating panel mount of the subject invention.
Figure 2:
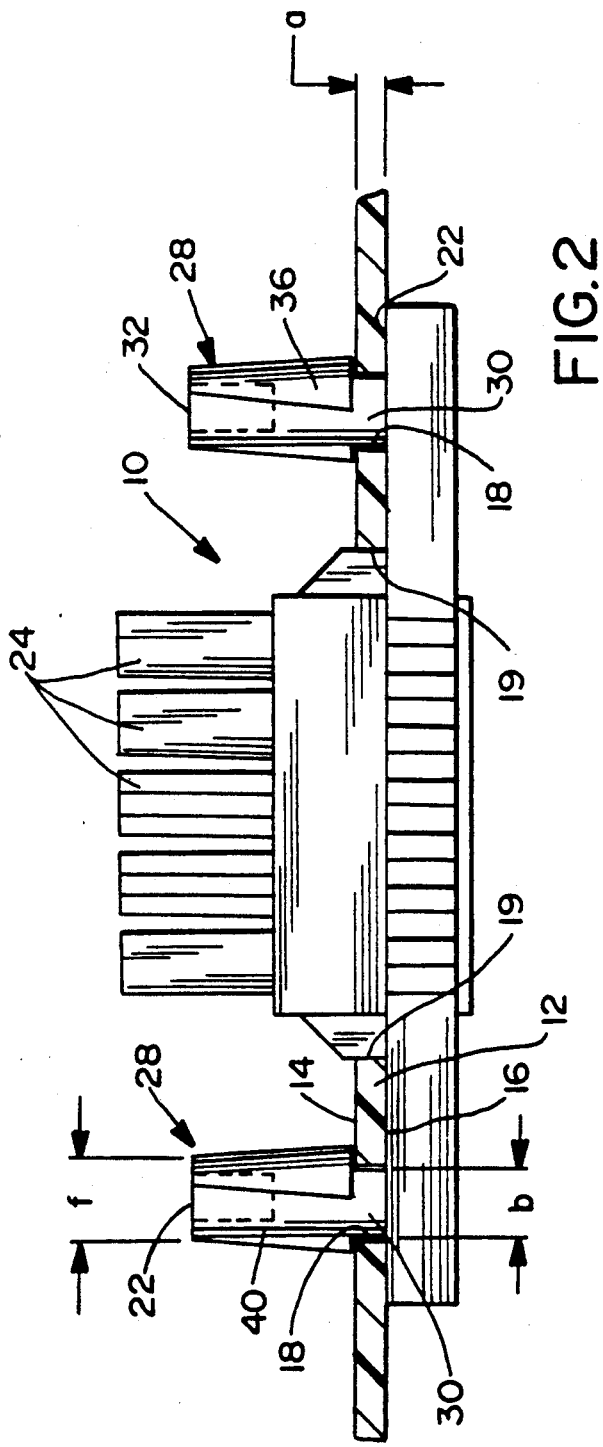
FIG. 2 is a side elevational view of the electrical connector shown in FIG. 1.
Figure 3:
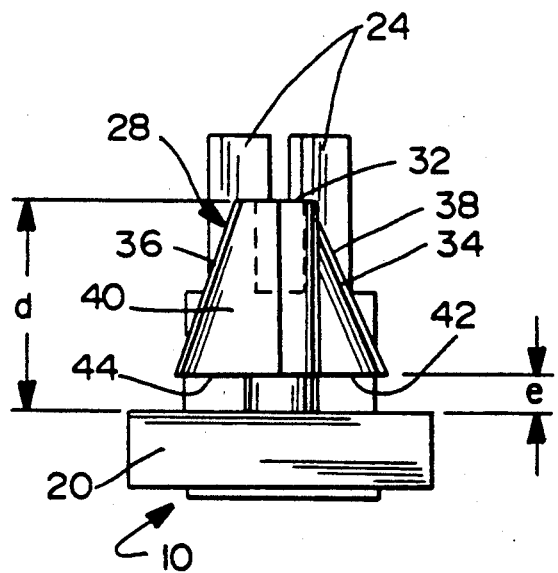
FIG. 3 is a front elevational view of the electrical connector shown in FIG. 1.

Referring to the drawings in greater detail, an electrical connector housing incorporating the panel mount of the subject invention is illustrated in FIGS. 1-3 and is identified generally by the numeral 10. The housing is unitarily molded from a plastic material, such as nylon, and is constructed to be floatably mounted relative to a generally planar panel which is identified by the numeral 12 in FIG. 2. More particularly, the panel is provided with opposed planar surfaces 14 and 16 defining a thickness "a" which, for example, may be approximately 0.09 inch. The panel is provided with a pair of mounting apertures 18 extending therethrough. Each mounting aperture 18 in panel 12 defines a diameter "b", the relative dimensions of which will be described in greater detail below. The panel further is provided with a mating aperture 19 extending therethrough and disposed intermediate a pair of the mounting apertures 18. The mating aperture is dimensioned to receive the mating portion of the electrical connector housing 10 as explained further herein.

The electrical connector housing 10 is molded to include a mounting flange 20 having a generally planar mounting surface 22 for mounting in face-to-face relationship with surface 16 of panel 12. Housing 10 further comprises mating structures 24 extending from mounting face 22 of mounting flange 20. The mating structures are formed to define a plurality of terminal receiving cavities 26 extending therethrough for lockingly receiving electrically conductive terminals (not shown) therein. The mating structures are receivable in correspondingly configured mating apertures of a mating connector housing (not shown). The mating structures 24 are configured such that electrical connector housing 10 defines a receptacle. It is to be understood, however, that the floating panel mount structure described herein can be incorporated in a plug connector housing.

Electrical connector housing 10 further includes a pair of floating panel mounts, generally designed 28, disposed on opposite sides of mating structures 24 and extending from mounting face 22 of mounting flange 20. More particularly, each floating panel mount 28 includes a support post 30 extending unitarily from mounting flange 20 and generally orthogonal to mounting ace 22. The support post defines a cross-sectional dimension which is less than diameter "b" of a mounting aperture 18 in panel 12. The support post extends from mounting face 22 of flange 20 to a top 32 to define a height "d" (FIG. 3) which is substantially greater than the thickness "a" of panel 12. However, the height "d" of the support post preferably is less than the overall height of mating structures 24 to minimize the height or profile of connector housing 10.

Each floating panel mount 28 further includes a pair of resiliently deflectable, generally spirally formed vanes 34 and 36 extending in generally opposite directions from generally opposite sides of each respective support post 30. The vanes 34,36 extend from a location generally adjacent the top 32 of the support post to a location spaced from mounting surface 22 of flange 20 by a distance "e" (FIG. 3) which preferably is equal to or slightly greater than thickness "a" of panel 12. Vanes 34 and 36 of each floating panel mount 28 define a minor cross-sectional dimension "f" (FIG. 2) at locations thereon generally adjacent the top of the support post 30. The minor cross-sectional dimension "f" is less than the diameter "b" of the mounting aperture 18 in panel 12. Vanes 34 and 36 gradually flare to wider dimensions at locations thereon spaced further from the top of support post 30. More particularly, portions of vanes 34 and 36 closest to the mounting face 22 of the mounting flange 20 define a major cross-sectional dimension "g" (FIG. 1) which is greater than the diameter "b" of the mounting aperture 18 in panel 12. Vanes 34 and 36 thus define generally frustum shaped outer surface 38 and 40, respectively. Vanes 34 and 36 further define panel engaging bottom surfaces 42 and 44, respectively. The bottom surfaces are formed to lie generally in a plane extending parallel to mounting face 22 of mounting flange 12, and are spaced therefrom by dimension "e" referred to above and illustrated most clearly in FIG. 3.

In assembly, the movement of electrical connector housing 10 toward the panel 12 generates ramping forces between tapered outer surfaces 38 and 40 of the vanes 34 and 36 against the periphery of mounting apertures 18 in panel 12. The ramping forces against the outer surfaces of the vanes will cause inward generally helical collapsing of the vanes toward support post 30. This gradual inward helical collapsing of vanes 34 and 36 enables the mounting flange 20 of the electrical connector housing 10 to be advanced toward the panel 12. As mounting surface 22 of the flange 20 approaches surface 16 of panel 12, bottom surfaces 42 and 44 of vanes 34 and 36 respectively will clear surface 14 of panel 12. This movement of vanes 34 and 36 beyond surface 14 of panel 12 will enable the vanes to resiliently return to their original position. As noted above, the major cross-sectional dimension "g" defined by the portions of the vanes adjacent bottom surfaces 42 and 44 significantly exceeds the width "b" of mounting aperture 18 in the panel. Thus, the panel will be effectively trapped between mounting surface 22 of flange 20 and bottom surfaces 42 and 44 of vanes 34 and 36. However, support post 30 defines a width which is substantially less than the diameter "b" of mounting aperture 18 in panel 16. Thus, the entire electrical connector housing 10 may float radially relative to panel 12 in response to forces exerted during mating, thereby ensuring proper alignment for mating the electrical connector housing with another electrical connector housing.

Figure 4:
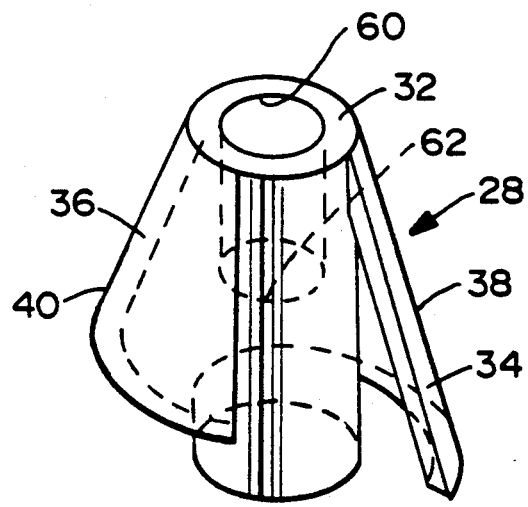
FIG. 4 is a perspective view, on an enlarged scale, of the support post of the floating panel mount, isolated from the housing to facilitate the illustration thereof.
Figure 5:
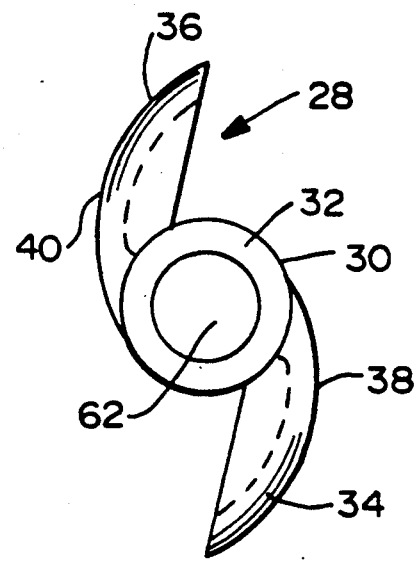
FIG. 5 is a top plan view looking down onto the post as depicted in FIG. 4.

The improvements of this invention are embodied in the configuration of support posts 30 as shown in the isolated depictions of FIGS. 4 and 5, in conjunction with FIG. 1. More particularly, as best seen in FIG. 5, support post 30 is circular in cross-section throughout substantially the entire length thereof from surface 22 of flange 20 to the top 32 of the post. This circular configuration has proven to improve the strength of the panel mount attachment provided by floating panel mounts 28 and, importantly, significantly decreases the complexity of the required mold to unitarily mold the entire electrical connector housing 10, including floating panel mounts 28.

Secondly, again as best seen in the enlarged depictions of FIGS. 4 and 5, in conjunction with FIG. 1, at least portions of posts 30 are hollowed out by an axial bore 60 extending from top 32 of each support post to a base 62 of the bore partially down the height of the post. The bore decreases the insertion forces involved when panel mounts 28 are inserted through apertures 18 in panel 12. Specifically, the insertion forces are reduced because the walls of each post 30, defined by the outside diameter of the circular post and the inside diameter defined by bore 60, can flex inwardly, particularly at the distal end of each post. However, withdrawal forces are not compromised due to maintaining the post strength as a solid structure between base 62 of bore 60 and flange 20 of the electrical connector housing 10.

In summary, a floating panel mount is provided for an electrical connector. The floating panel mount may be unitarily molded with the electrical connector housing to extend from a generally planar mounting flange thereof. The floating panel mount includes a circular support post extending generally orthogonal to the mounting flange of the electrical connector housing, with a pair of helically inwardly collapsible vanes extending from opposite sides of the support post. The circular support post provides increased strength for the attachment capabilities of the panel mount. The vanes are configured to be helically inwardly collapsed against the support post in response to forces exerted on outer portions of the vanes as the floating panel mounts are urged into the mounting aperture of a panel. The bore in the support post decreases the insertion forces involved. After complete mounting, the panel will be engaged between the mounting flange of the electrical connector housing and the bottom edges of the vanes. This engagement prevents backup during mating, but permits radial float of the electrical connector housing relative to the panel. The vanes preferably are formed to be of a generally spiral configuration with generally frustum shaped outer surfaces to permit the inward helical collapsing of the vanes relative to the support post during mounting of the electrical connector housing to a panel.

While the invention has been described with respect to certain preferred embodiments, it is apparent that various changes can be made without departing from the scope of the invention as defined by the appended claims. In particular, the floating panel mount need not be unitarily molded with the electrical connector housing but may define a separate structure used in combination with an electrical connector housing.

I claim:

1. A floating panel mount for mounting an electrical connector to a panel, said panel having at least one mounting aperture therein, said floating panel mount comprising:
   a mounting flange;
   a support post extending from said mounting flange, said support post having a cross-sectional dimension less than the cross-sectional dimensions of the mounting aperture and having a length greater than the thickness of the panel, the post being generally circular in cross-section throughout substantially the entire length thereof; and
   a pair of vanes extending from opposite sides of said support post at locations thereon spaced from said mounting flange, said vanes extending generally spirally about said support post in spaced relationship thereto, portions of said vanes in proximity to the mounting flange defining a cross-sectional dimension greater than the cross-sectional dimension of the mounting aperture, said vanes being resiliently deflectable inwardly toward said support post to define a cross-sectional dimension less than the cross-sectional dimension of the mounting aperture, whereby the vanes are deflectable inwardly to permit passage of the vanes through the mounting aperture, and are resiliently returnable to an undeflected condition with the panel floatably engaged between the mounting flange and the vanes; and
   wherein said support post has a bore extending axially from a distal end thereof to decrease the force required to insert said floating panel mount into said aperture.

2. A floating panel mount as in claim 1 wherein said bore extends only partially through the length of the post.

3. A floating panel mount as in claim 1 wherein said vanes are spaced from the mounting flange by a distance slightly greater than the thickness of the panel.

4. A floating panel mount as in claim 1 wherein the electrical connector comprises a housing, and said floating panel mount is unitarily molded with the housing.

5. A floating panel mount as in claim 4 wherein said vanes are spaced from the mounting flange by a distance slightly greater than the thickness of the panel.

6. An electrical connector housing for floatable mounting to a panel, said panel comprising a pair of spaced apart mounting apertures extending therethrough, each said aperture defining a cross-sectional dimension, said electrical connector housing comprising a pair of spaced apart floating panel mounts for engaging the mounting apertures of the panel and permitting limited float between the electrical connector housing and the panel, each said floating panel mount comprising:
   a generally planar mounting flange;
   a support post extending substantially perpendicularly from the mounting flange for a distance greater that the thickness of the panel, said support post defining a cross-sectional dimension that is less than the cross-sectional dimension of the mounting aperture, the post being generally circular in cross-section throughout substantially the entire length thereof; and
   a pair of vanes extending along substantially the entire length and from generally opposite sides of the support post at locations thereon spaced from the mounting flange, each said vane extending generally spirally about said support post and being resiliently deflectable inwardly toward said support post, said vanes being tapered to define a minor width at locations thereon most distant from the mounting flange and to define a major width at locations thereon closer to the mounting flange, the minor width defined by the vane being less than the cross-sectional dimension of the mounting aperture, the major width defined by said vane being greater than the cross-sectional dimension defined by the mounting aperture; and
   wherein said support post has a bore extending axially from a distal end thereof to decrease the force required to mount said electrical connector to said panel.

7. An electrical connector housing as in claim 6 wherein said bore extends only partially through the length of the post.

8. An electrical connector housing as in claim 6 wherein each said vane includes a panel engaging surface defining the portion of said vane closest to the mounting flange, the panel engaging surface being spaced from the mounting flange by a distance slightly greater than the thickness of the panel.

9. An electrical connector housing as in claim 8 wherein the vanes define a width in their inwardly deflected condition that is less than the cross-sectional dimension of the mounting aperture.

10. A floating panel mount for mounting an electrical connector to a panel, said panel having at least one mounting aperture therein, said floating panel mount comprising:
   a mounting flange;
   a support post extending from said mounting flange, said support post having a cross-sectional dimension less than the cross-sectional dimension of the mounting aperture and a length greater than the thickness of the panel, the post being generally circular in cross-section throughout substantially the entire length thereof; and a generally frusto-conically shaped securing means extending generally about said support post in spaced relationship thereto, said securing means having first and second ends, said first end being adjacent to but spaced from the mounting flange by a distance slightly greater than the thickness of the panel, the cross-sectional dimension of said first end being greater than the cross-sectional dimension of the mounting aperture, said securing means being resiliently deflectable inwardly toward said support post to define a cross-sectional dimension less than the cross-sectional dimension of the mounting aperture;

said securing means comprises at least one vane, said at least one vane extending along substantially the entire length of said support post spaced from said mounting flange; and wherein said support post has a bore extending axially from a distal end thereof to decrease the force required to insert said securing means through said mounting aperture.

11. A floating panel mount as in claim 10 wherein said bore extends only partially through the length of the post.

* * * * *